(12) United States Patent
Warashina et al.

(10) Patent No.: US 6,618,905 B2
(45) Date of Patent: Sep. 16, 2003

(54) HANDLE HOLDER FOR BUSH CUTTING MACHINE

(75) Inventors: Makoto Warashina, Wako (JP); Hiroaki Uchitani, Wako (JP); Hideshi Sasaki, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 43 days.

(21) Appl. No.: 10/055,286

(22) Filed: Jan. 23, 2002

(65) Prior Publication Data

US 2002/0104193 A1 Aug. 8, 2002

(30) Foreign Application Priority Data

Jan. 24, 2001 (JP) ........................................ 2001-015365

(51) Int. Cl.[7] .............................. F16B 1/00; B62K 21/26
(52) U.S. Cl. .................... 16/426; 248/229.14; 403/373; 74/551.3
(58) Field of Search ....................... 16/426; 248/229.14, 248/229.11, 230.2, 231.31, 316.2, 316.6; 403/373, 374.1, 374.2, 374.3, 374.4; 74/551.3, 551.8

(56) References Cited

U.S. PATENT DOCUMENTS 4,288,171 A * 9/1981 Kottke ........................ 403/218
5,167,353 A * 12/1992 Hughes ....................... 224/451
5,678,458 A * 10/1997 Kao ........................... 74/551.3
5,881,606 A * 3/1999 Roddy ........................ 74/551.3
5,941,653 A * 8/1999 Cipriani ...................... 403/344
5,970,692 A * 10/1999 Foster ......................... 56/12.1
6,056,668 A * 5/2000 Nagashima ................... 477/207
6,305,241 B1 * 10/2001 Masui et al. ................ 74/551.8

FOREIGN PATENT DOCUMENTS

| JP | 01032511 | 10/1989 |
|----|----------|---------|
| JP | 06005699 | 2/1994  |

* cited by examiner

Primary Examiner—Lloyd A. Gall
Assistant Examiner—William D Hutton
(74) Attorney, Agent, or Firm—Adams & Wilks

(57) ABSTRACT

A handle holder for mounting a U-shaped handle to an operating pole of a bush cutting machine. The handle holder has a first holding member and a second holding member. The first holding member has an operating pole insertion hole for insertion of the operating pole therethrough, an oblique groove, and a handle receiving groove for receiving the base of the handle. The second holding member has a wedge and a handle retaining groove. The wedge is fitted into the groove of the first holding member to fix the first holding member to the operating pole. The handle is interposed and held between the handle receiving groove of the first holding member and the handle retaining groove of the second holding member to be fixed to the first holding member.

2 Claims, 6 Drawing Sheets

HANDLE HOLDER FOR BUSH CUTTING MACHINE

FIELD OF THE INVENTION

This invention relates to an improved handle holder for mounting handles to operating poles of bush cutting machines.

BACKGROUND OF THE INVENTION

Such kind of handle holder for bush cutting machines is disclosed, for example, in Japanese Utility Model Laid-Open Publication No. HEI-6-5699 entitled "Mounting Structure for Operating Handle of Bush Cutting Machine" or in Japanese Utility Model Laid-Open Publication No. HEI-1-32511 entitled "Handle Mounting Structure."

A bush cutting machine disclosed in HEI-6-5699 has an engine provided at a proximal end of an operating pole, a drive shaft contained in the operating pole and rotated by the engine, a cutter attached to a distal end of the operating pole and rotated by the drive shaft, and a U-Shaped handle mounted via a faster to the operating pole between the cutter and the engine.

In mounting the handle to the operating pole, the operating pole is first interposed and held between upper and lower fastening parts which constitute the faster. Then the base of the U-shaped handle is inserted into a receiving hole formed in the upper fastening part in a direction orthogonal to the operating pole. Thereafter fastening bolts are inserted from bolt holes formed in the upper fastening part into screw holes formed in the lower fastening part, being screwed into the screw holes for fastening, and thereby mounting the handle to the operating pole. In short, the operating pole and the handle are fastened to one another via the fastening bolts.

During the fastening, a washer is slid into a slot which communicates with the receiving hole, extending the length of the receiving hole in the upper fastening part. The washer is formed with dislocation-preventing protrusions which are fitted into fitting portions formed in the base of the handle, thereby preventing the handle from rotating or slipping off.

In the above handle mounting structure, however, operating load of the U-shaped handle directly acts on the fastening bolts. It is therefore required that the fastening bolts be made thick or the number of fastening bolts used be increased, resulting in increased weight of the bush cutting machine. Operability of the bush cutting machine is thus lowered for long-time work with the bush cutting machine hung on a shoulder. It is further necessary to fit the protrusions formed at the washer into the fitting portions of the U-shaped handle when mounting the handle to the operating pole, and to adjust in position bolt holes formed in the washer to the bolt holes formed in the upper fastening part, taking time in assemblage.

HEI-1-32511 discloses a handle mounting structure in which a bracket is first bolt fixed to an operating pole of a bush cutting machine. A lower bracket is attached to the bracket. The base of a U-shaped handle is interposed between an upper bracket and the lower bracket and fastened via fastening bolts. A hook and a protrusion, which constitute an engagement member, are provided to the upper and lower brackets, respectively, in a position opposite to the fastening bolts, and engaged with one another. Thus, the base of the handle is fastened between the upper and lower brackets via the engagement member and the fastening bolts, so that no unbalance occurs in fastening force, enabling the handle to be firmly mounted to the operating pole.

In the above handle mounting structure, however, the bracket to which the lower bracket is attached, is attached to the operating pole via the bolt, and the fastening bolts are additionally used for mounting the handle. Thus, many bolts are used for mounting the handle to the operating pole, requiring much time for assemblage.

SUMMARY OF THE INVENTION

It is therefore an object of the present invention to provide a handle holder for bush cutting machines with reduced weight, enabling improved production efficiency.

According to an aspect of the present invention, there is provided a handle holder for fixing a handle to an operating pole of a bush cutting machine containing a drive shaft rotated by an engine driven, which comprises: a first holding member having an operating pole insertion hole for inserting the operating pole therethrough, a groove formed along the operating pole insertion hole, and a handle receiving groove orthogonal to the operating pole insertion hole, for covering substantially ½ of a total circumference of the handle; a second holding member having a wedge inserted into the groove, and a handle retaining groove arranged opposite to the handle receiving groove, for covering substantially ½ of the total circumference of the handle; and a plurality of bolts for connecting the first holding member and the second holding member; wherein, the first holding member is fixed to the operating pole with the wedge inserted into the groove, and the handle is interposed and fixed between the handle receiving groove of the first holding member and the handle retaining groove of the second holding member.

Thus in the present invention, the handle is fixed to the operating pole via the handle holder. During the fixation, the handle is interposed and held between the first holding member and the second holding member, and then the first and second holding members are fastened via the bolts. During the fastening, the operating pole and the handle holder are fixed with the wedge pressed into the groove, producing wedging effects. This leads to elimination of a bolt used only for fixing the handle holder to the operating pole, reducing the number of bolts in half, and thereby reducing the component cost and the number of assembling steps.

Further, in the present invention, the second holding member is attached to the first holding member in a direction opposite to the engine toward the cutter. With this attachment, when an operator propels the operating pole to an object to be cut such as weeds, gripping the handle, forward force also acts on the handle holder via the handle. However, the first and second holding members receive such force as to connect these members to one another via the wedge, so that only small pulling force acts on the bolts. This eliminates the need for a larger-diameter bolt for increased strength, enabling the bolts to be smaller in diameter, and thereby reducing the size of the handle holder.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
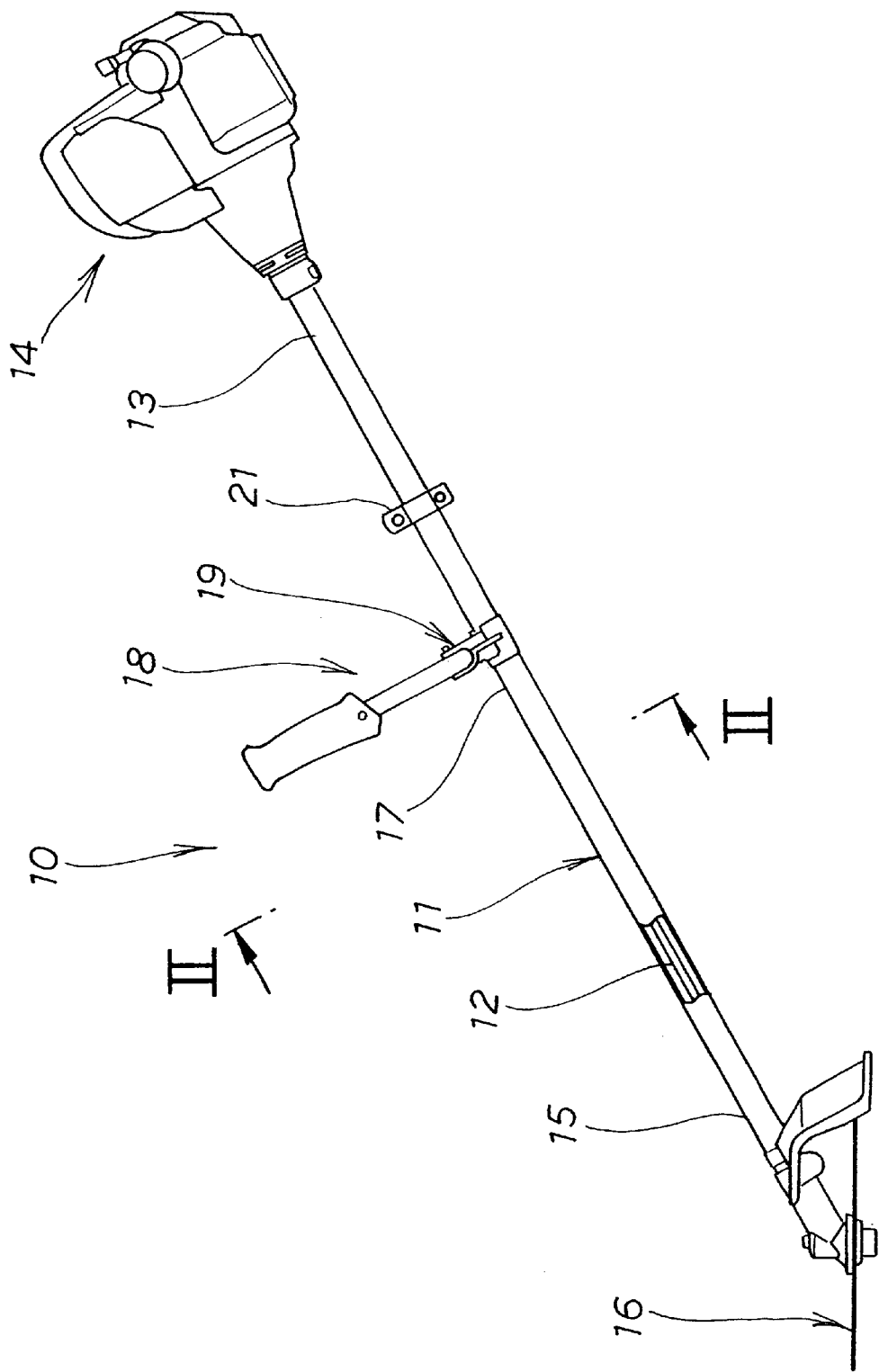
FIG. 1 is a side view of a bush cutting machine with a handle holder according to the present invention.
Figure 2:
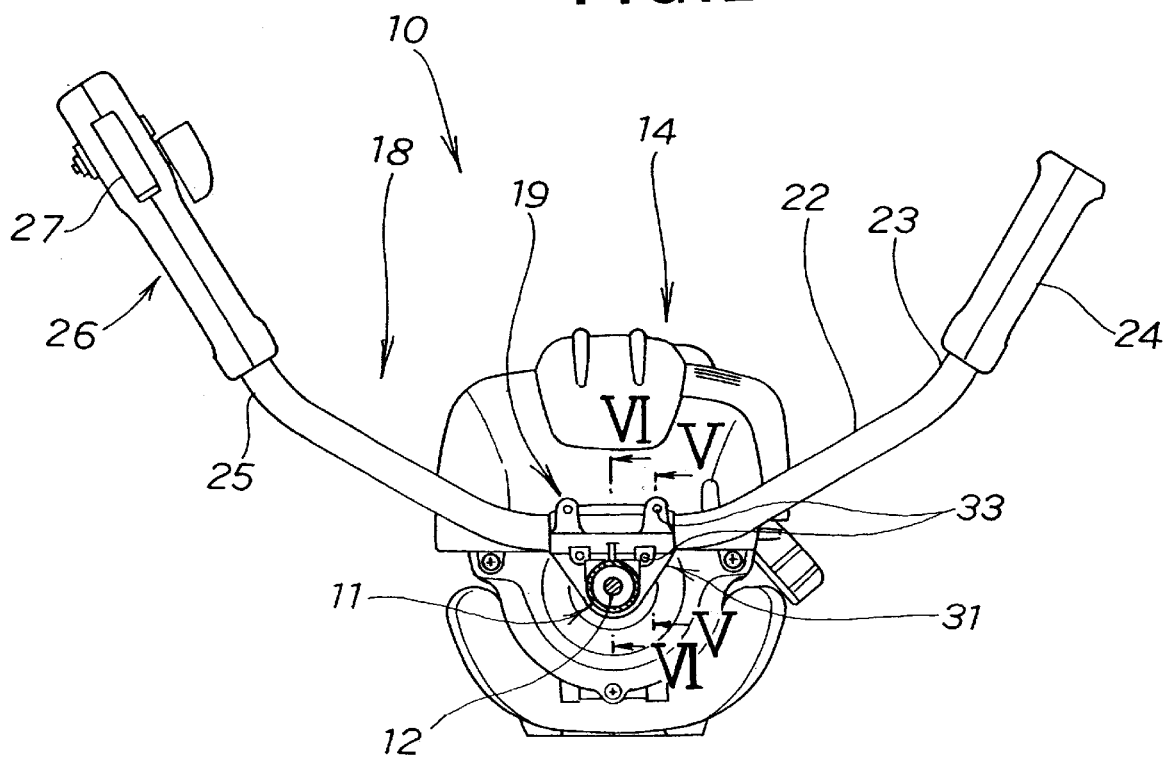
FIG. 2 is an enlarged cross-sectional view taken along line II—II in FIG. 1.

Referring to FIG. 1, a bush cutting machine 10 has an operating pole 11 in a pipe shape, an engine 14 provided at a proximal end of the operating pole 11, and a cutter 16 in a disc shape provided at a distal end 15 of the operating pole 11. A drive shaft 12 is contained in the operating pole 11 and rotated by the engine driven. The rotation of the drive shaft 12 causes the cutter 16 to rotate. A handle 18 for operating the bush cutting machine 10 is fixed via a handle holder 19 to the operating pole 11 at a desired position (substantially in the middle in the figure) between the engine 14 and the cutter 16. The handle 18 is U-shaped as shown in FIG. 2. Reference numeral 21 denotes a hanging attachment for attaching a shoulder hanging belt.

FIG. 2 shows the handle 18 fixed to the operating pole 11 via the handle holder 19.

The handle 18 has a handle body 22 of a pipe or a bar, a left grip 24 at a left portion 23 of the body 22, and a controller 26 at a right portion 25. The controller 26 has a throttle lever 27 for controlling the number of revolutions of the engine 14. A wire (not shown) connected to the throttle lever 27 is extended through the handle holder 19 and the operating pole 11 and connected to the engine 14.

Figure 3:
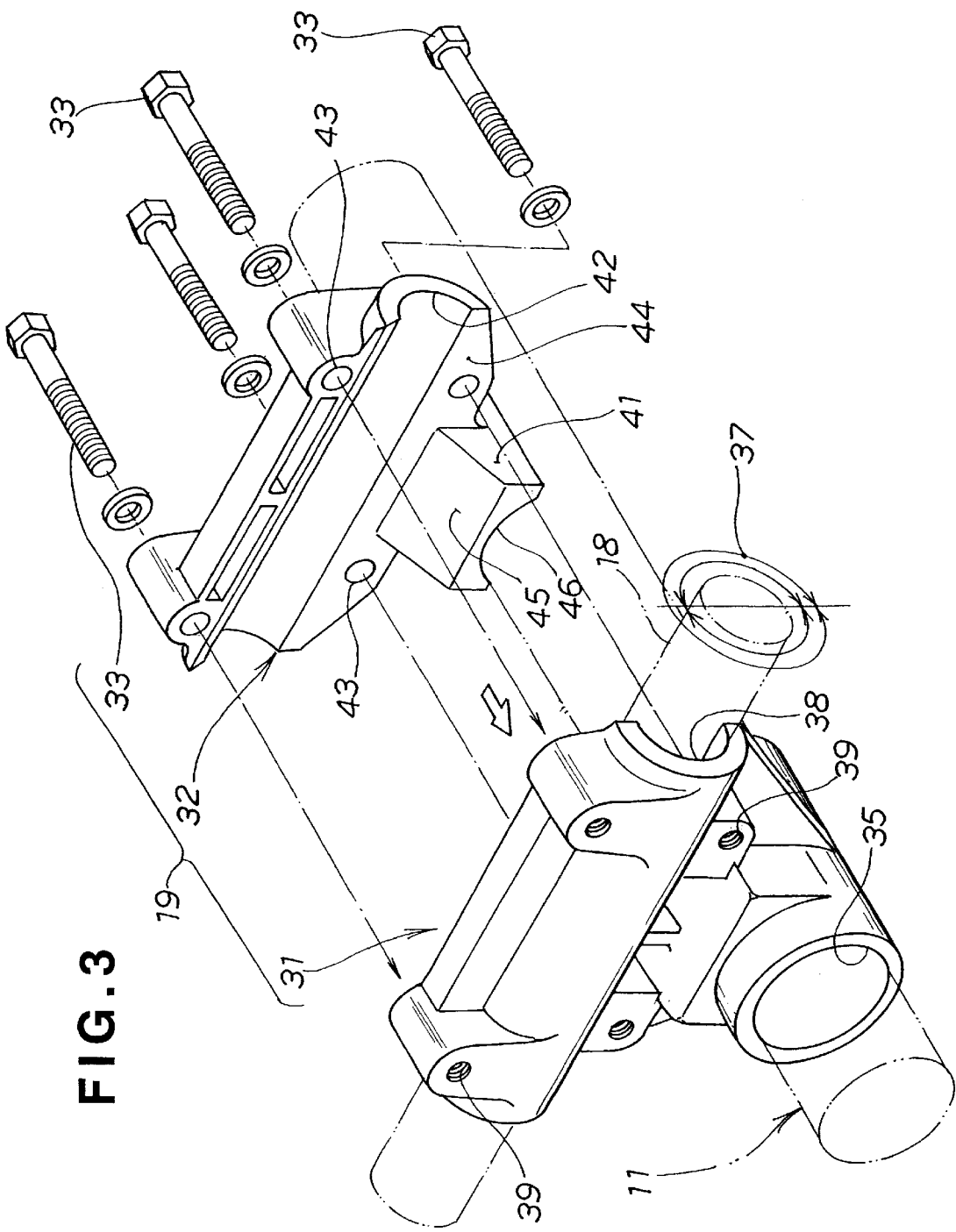
FIG. 3 is an exploded perspective view of the handle holder according to the present invention shown in FIG. 1.

The handle holder 19 consists of a separable first holding member 31 and second holding member 32 as shown in FIG. 3. These holding members 31, 32 are connected via four bolts 33.

As shown in FIG. 3, the first holding member 31 has an operating pole insertion hole 35 through which the operating pole 11 is inserted, a groove 36 (See FIG. 4) formed along the insertion hole 35, and a handle receiving groove 38 orthogonal to the insertion hole 35, for covering substantially ½ of a total circumference 37 of the handle 18. The handle receiving groove 38 is arranged opposite to the cutter 16 (See FIG. 1). The first holding member 31 has a plurality of screw holes 39. The screw holes 39 receive the respective bolts 33.

The second holding member 32 has a wedge 41 to be inserted into the groove 36 of the first holding member 31, and a handle retaining groove 42 arranged opposite to the handle receiving groove 38 of the first holding member 31, for covering substantially ½ of the total circumference 37 of the handle 18. Reference numeral 43 denotes through holes for inserting the respective bolts 33. Reference numeral 44 denotes a split surface. The wedge 41 has a wedge surface 45 as the upper surface and an operating pole abutting part 46 formed in the lower surface.

Figure 4:
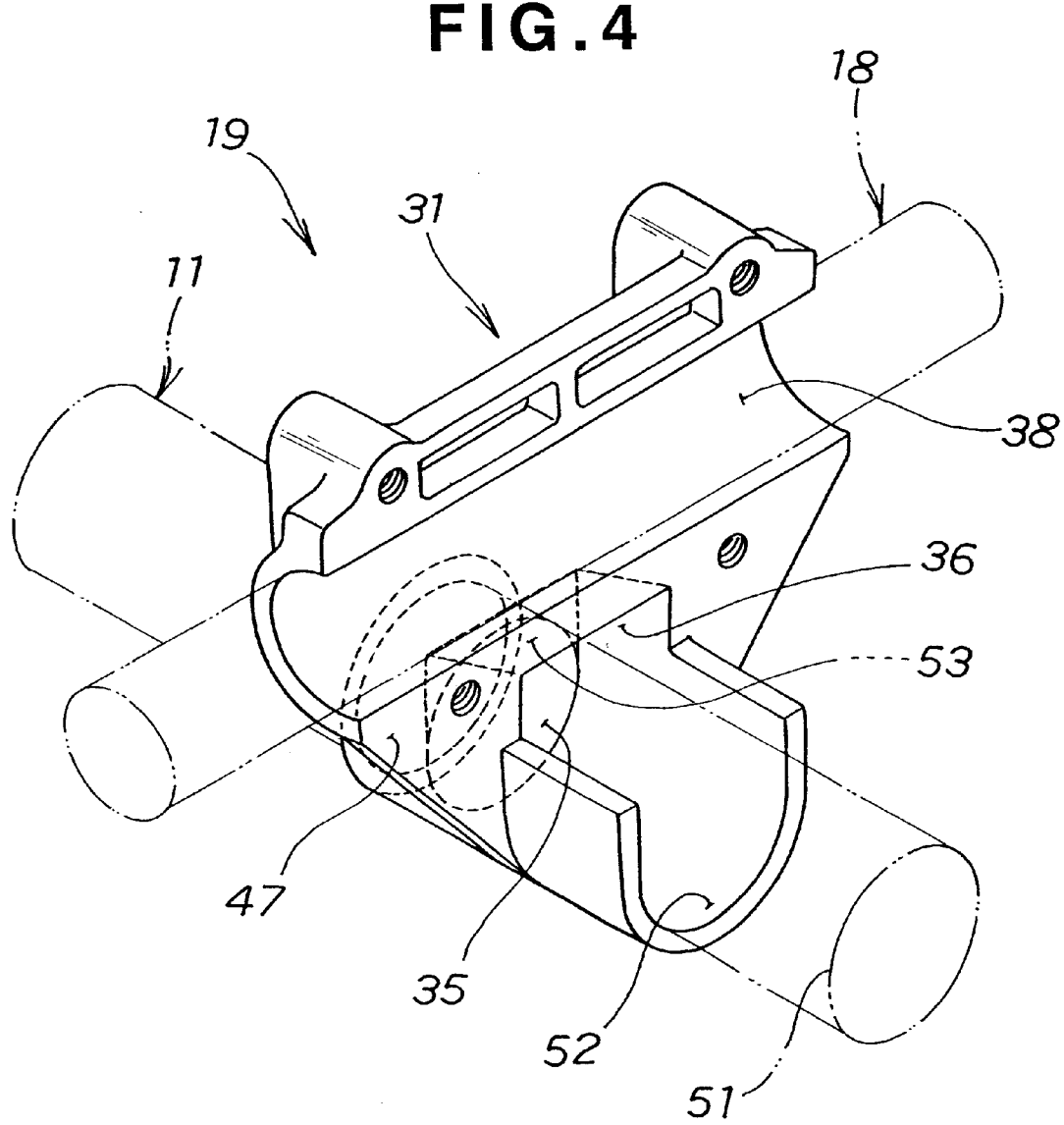
FIG. 4 is a perspective view of a first holding member shown in FIG. 3.

FIG. 4 shows the first holding member 31 shown in FIG. 3. The groove 36 is formed in the first holding member 31 so as to extend along the operating pole insertion hole 35. Reference numeral 47 denotes a split surface. The insertion hole 35 has an operating pole receiving groove 52 for covering substantially ½ of a total circumference 51 of the operating pole 11. The groove 36 has an oblique surface 53 in a surface opposite to the receiving groove 52.

Figure 5:
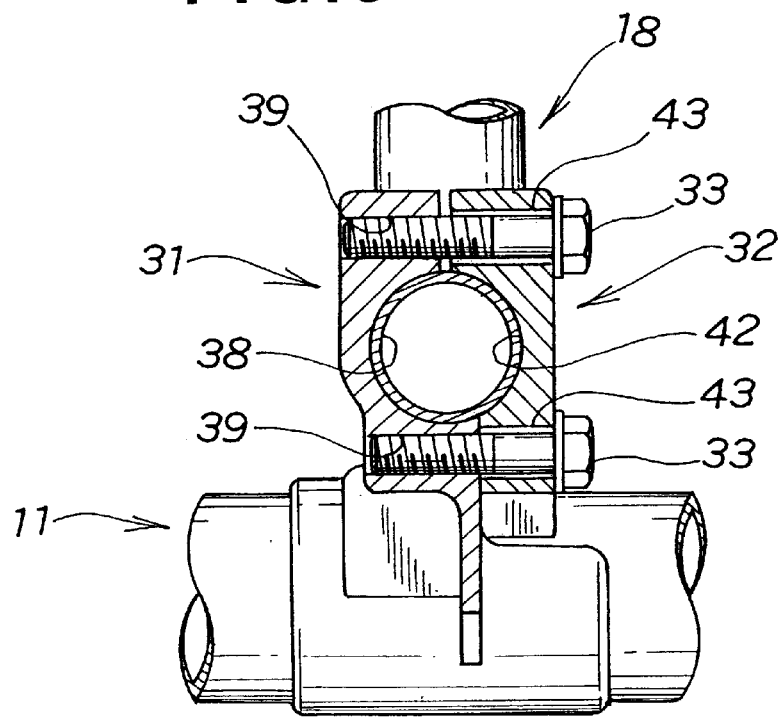
FIG. 5 is an enlarged cross-sectional view taken along line V—V in FIG. 2.

As shown in FIG. 5, the bolts 33 are inserted into the respective through holes 43 of the second holding member 32, and screwed into the screw holes 39 of the first holding member 31 so that the handle 18 is interposed and held between the handle receiving groove 38 of the first holding member 31 and the handle retaining groove 42 of the second holding member 32, thereby being fixed to the handle holder 19.

Figure 6:
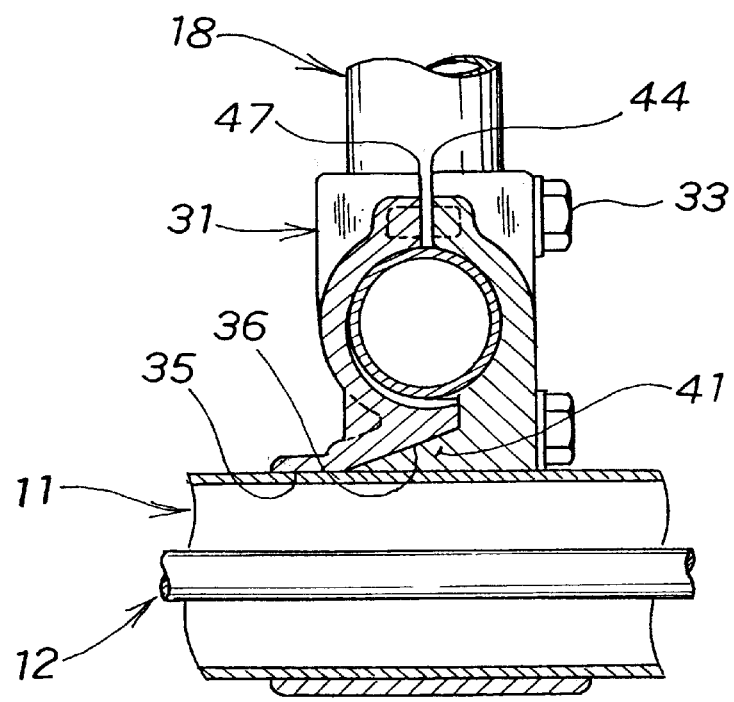
FIG. 6 is an enlarged cross-sectional view taken along line VI—VI in FIG. 2.

As shown in FIG. 6, the operating pole 11 is extended through the operating pole insertion hole 35, and the wedge 41 of the second holding member 32 is inserted into the groove 36 of the first holding member 31, whereby the first holding member 31 is fixed to the operating pole 11.

Now with reference to FIGS. 7A and 7B, a method of mounting the handle 18 to the operating pole 11 via the handle holder 19 will be described.

Figure 7A:
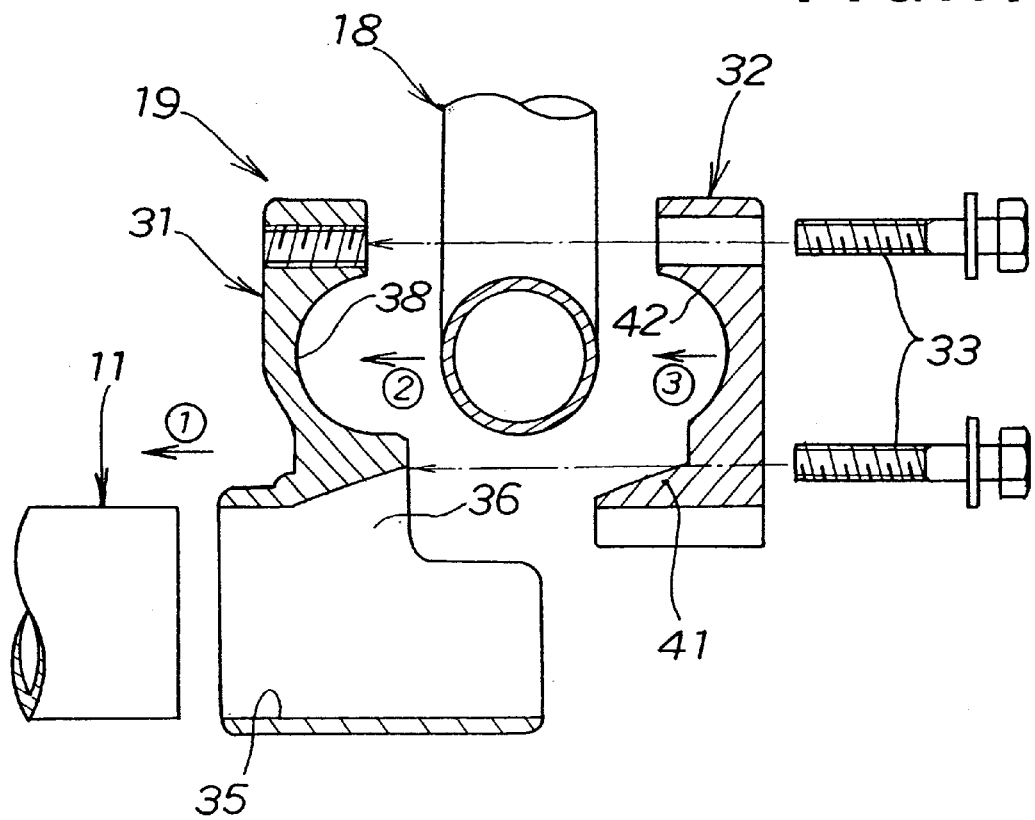
FIGS. 7A and 7B are diagrams illustrating the assemblage of the handle holder according to the present invention and force acting on the holder, respectively.

As shown in FIG. 7A, the handle holder 19 used for assemblage consists of the first and second holding members 31, 32 and the four bolts 33, a significantly small number of components.

In assemblage, the operating pole insertion hole 35 of the first holding member 31 is put and slid on the operating pole 11 as shown by arrow ①. Then the handle 18 is fitted into the handle receiving groove 38 formed in the first holding member 31 as shown by arrow ②, and is held by the handle retaining groove 42 of the second holding member 32 as shown by arrow ③. Then the wedge 41 of the second holding member 32 is fitted into the groove 36 of the first holding member 31, and the four bolts are screwed. That is, the first and second holding members 31, 32 are bolted to one another after the handle 18 is interposed therebetween.

Figure 7B:
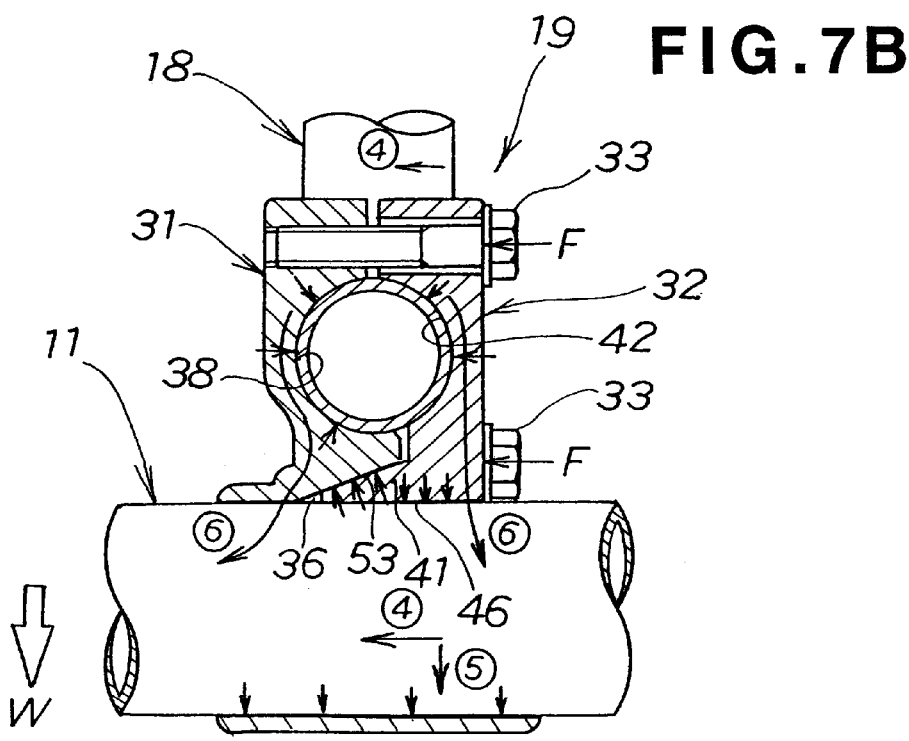

As shown in FIG. 7B, the operating pole 11 and the handle holder 19 are fixed to one another with the wedge 41 pressed into the groove 36, producing wedging effects. More specifically, with the plurality of bolts 33 screwed, the second holding member 32 is slid toward the first holding member (in the direction of arrow ④) by axial force F (fastening force) of the bolts 33, and the wedge 41 of the second holding member 32 receives downward force from the oblique surface 53 of the first holding member 31. That is, the second holding member 32 is moved in the direction of arrow ⑤ orthogonal to the operating pole 11, so that the operating pole abutting part 46 presses the operating pole 11, whereby the first and second holding members 31, 32 are fixed to the operating pole 11.

At that time, the sliding second holding member 32 causes the handle retaining groove 42 to press the handle 18, thereby sandwiching and holding the handle 18 with the handle receiving groove 38.

This structure eliminates a bolt used only for fixing the handle holder 19 to the operating pole 11. As a result, the number of bolts is reduced in half, reducing the cost of components and the number of assembling steps required.

Further, the fixation of the handle holder 19 to the operating pole 11 and the fixation of the handle 18 can be simultaneously performed only with the plurality of bolts 33, which facilitates the mounting of the handle 18. Thus production efficiency is improved.

Furthermore, the plurality of bolts 33 serves both the fixation of the handle holder 19 to the operating pole 11 and the fixation of the handle 18, reducing the weight of the handle holder 19. In addition, this facilitates dissembling and reassembling of the structure, enhancing ease of assemblage and maintainability.

Since the handle receiving groove 38 of the first holding member 31 covers approximately ½ of the total circumference of the handle 18, and the handle retaining groove 42 of the second holding member 32 covers approximately ½ of the total circumference of the handle 18, weight W through the grooves 38 and 42 during bush cutting operation acts on the operating pole 11 as shown by arrows ⑥, ⑥, and does not cause pulling force directly acting on the bolts 33. This enables a bolt to be smaller in diameter or a reduced number of bolts required, thereby reducing the weight of the handle holder 19.

As shown in FIG. 7B, the second holding member 32 opposing to the engine 14 shown in FIG. 1 is attached via the wedge 41 to the first holding member 31 in the direction of arrow ④. When an operator not shown propels the operating pole 11 toward an object to be cut such as weeds, gripping the handle 18, forward force also acts on the handle holder 19 via the handle 18. However, since the first and second holding members 31, 32 receive such force as to connect these members 31, 32 to one another via the wedge 41, only small pulling force acts on the plurality of bolts 33. This eliminates the need for a larger-diameter bolt for increasing the strength, enables the bolt to be smaller in diameter, thereby reducing the size of the handle holder.

It is also possible to form a groove or recess in the handle receiving groove 38 and the handle retaining groove 42 shown in FIG. 3 according to the embodiment of the present invention. The present invention does not limit the number of bolts to four.

The present disclosure relates to the subject matter of Japanese Patent Application No. 2001-015365, filed Jan. 24, 2001, the disclosure of which is expressly incorporated herein by reference in its entirety.

What is claimed is:

1. A handle holder for fixing a handle to an operating pole of a bush cutting machine containing a drive shaft rotated by an engine driven, comprising:

a first holding member having an operating pole insertion hole for inserting said operating pole therethrough, a groove formed along said operating pole insertion hole, and a handle receiving groove orthogonal to said operating pole insertion hole, for covering substantially ½ of a total circumference of said handle;

a second holding member having a wedge inserted into said groove, and a handle retaining groove arranged opposite to said handle receiving groove, for covering substantially ½ of the total circumference of said handle; and a plurality of bolts for connecting said first holding member and said second holding member; wherein,
      said first holding member is fixed to said operating pole with said wedge inserted into said groove, and said handle is interposed and fixed between said handle receiving groove of said first holding member and said handle retaining groove of said second holding member.

2. A handle holder according to claim 1, wherein said second holding member is attached to said first holding member in a direction opposite to said engine.

* * * * *